Jan. 17, 1956 H. W. BURDETT ET AL 2,731,119
HYDRAULIC COUPLING CONSTRUCTION
Original Filed Sept. 7, 1945
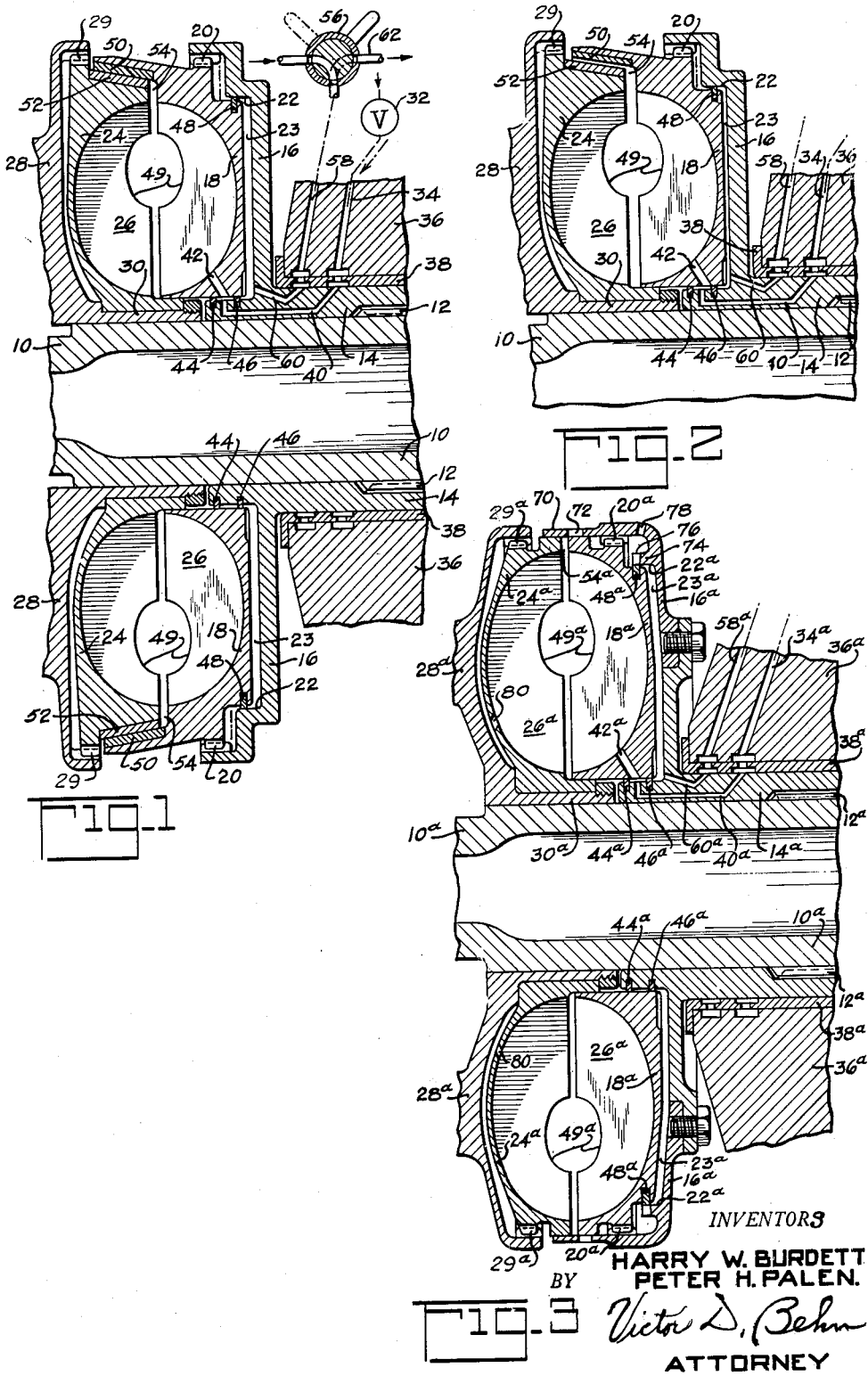
INVENTORS
HARRY W. BURDETT
PETER H. PALEN.
BY
ATTORNEY

United States Patent Office 2,731,119
Patented Jan. 17, 1956

2,731,119
HYDRAULIC COUPLING CONSTRUCTION

Harry W. Burdett, Ridgewood, and Peter H. Palen, Denville, N. J., assignors to Curtiss-Wright Corporation, a corporation of Delaware Original application September 7, 1945, Serial No. 614,850, now Patent No. 2,544,542, dated March 6, 1951. Divided and this application December 30, 1950, Serial No. 203,674

2 Claims. (Cl. 192—3.2)

This invention relates to hydraulic couplings and is particularly directed to means for controlling the slip of a hydraulic coupling. This application is a division of our copending application Serial No. 614,850, filed September 7, 1945, now Patent No. 2,544,542, patented March 6, 1951.

An object of the present invention comprises a provision of novel means for controlling the magnitude of the slip of hydraulic couplings. Specifically the vaned hydraulic coupling elements are adapted to be moved axially relative to each other to control the slip of the coupling. In addition, it is an object of this invention to provide novel means for frictionally locking the hydraulic coupling elements together.

Other objects of the invention will become apparent upon reading the annexed detailed description in connection with the drawing in which:

Figure 1 is an axially sectional view through a hydraulic coupling embodying the invention with the coupling elements in position for minimum slip;

Figure 2 is a partial view similar to Figure 1 but illustrating the coupling elements in position for maximum slip; and Figure 3 is a view similar to Figure 1 but illustrating a modified form of the invention.

Referring to the drawing, a drive member or shaft 10 is splined at 12 to the hub 14 of an annular hydraulic housing member 16. A hydraulic coupling element 18 is piloted on said hub 14 of the housing 16 and is drivably splined to said housing at 20 for rotation therewith but so as to permit relative axial movement therebetween. The rotary housing 16 is formed with an internal cylindrical surface 22 within which a piston-like portion of the hydraulic coupling element 18 is fitted for axial sliding movement thereby forming an annular space 23 between the coupling element 18 and the housing 16.

A second hydraulic coupling element 24 is co-axially disposed relative to the hydraulic coupling element 18 to define a working chamber 26 therebetween. The second hydraulic coupling element 24 is drivably splined to a drive member 28 at 29 and is piloted about a hub portion 30 of said drive member, said hub portion in turn being piloted on the shaft 10. As will appear, torque may be transmitted either from the drive member 10 to the drive member 28 or in the reverse direction.

The working chamber 26 of the hydraulic coupling is supplied with liquid, preferably oil, under the control of a valve 32. Oil is supplied from the valve 32 through a passage 34 in a fixed support member 36 and thence through an oil transfer bushing 38 to a passage 40 in the rotary hub 14, said passage 40 communicating with a passage 42 in the hydraulic coupling element 18. Axially-spaced seal rings 44 and 46 are disposed between the hydraulic coupling element 18 and the hub 14 on opposite sides of the passages 40 and 42 to prevent leakage of the hydraulic coupling liquid between the coupling element 18 and the hub 14. In addition a seal ring 48 is disposed between the hydraulic coupling element 18 and the cylinder 22 whereby said latter ring together with the ring 46 seals the annular space 23.

The hydraulic coupling elements 18 and 24 are provided with the usual circumferentially-spaced vanes 49 extending across the working chamber 26 whereby torque can be transmitted from either coupling element to the other through the liquid within the chamber 26. Conventional hydraulic couplings operate with approximately 3% slip, that is the speed of the driven coupling member is approximately 3% lower than the speed of the driving coupling member. In the embodiment of Figures 1 and 2, the hydraulic coupling elements 18 and 24 are provided with facing frictionally engageable clutch members 50 and 52 adjacent to their respective outer peripheries, the friction clutch members 50 and 52 being rotationally rigid with their respective hydraulic coupling elements 18 and 24. As illustrated the friction clutch members 50 and 52 are cone clutch members but as will appear this specific construction is not essential, for example instead of being conical said friction clutch members could be flat.

The hydraulic coupling element 18 is axially movable relative to its complementary element 24 to an extent sufficient to cause engagement and disengagement of the friction clutch members 50 and 52. When the friction clutch members 50 and 52 are engaged the hydraulic coupling elements 18 and 24 are frictionally locked together thereby insuring rotation of said hydraulic coupling elements at zero per cent slip, that is at 1:1 speed ratio. Engagement of the friction clutch members 50 and 52 not only drivably connects the coupling elements 18 and 24 at 1:1 speed ratio but said engagement also closes the periphery of the coupling chamber 26 against leakage of liquid radially outward from said chamber through the annular passage 54 between said hydraulic coupling elements.

Axial movement of the hydraulic coupling element 18 relative to the hydraulic coupling element 24 is obtained by controlling the application of a fluid under pressure to the annular space 23. For this purpose fluid under pressure is supplied to a valve 56 through a conduit. When the valve 56 is in the position illustrated, said fluid is supplied from the valve 56 through a passage 58, across the bushing 38 and thence through a passage 60 to the annular space 23. Fluid is supplied to the annular space 23 under a pressure sufficient to move the hydraulic coupling element 18 axially toward the hydraulic coupling element 24 against the pressure of the coupling liquid within the chamber 26 to cause engagement of the friction clutch members 50 and 52 (as illustrated in Figure 1). The friction clutch members 50 and 52 are disposed so that at the time they engage the hydraulic coupling elements 18 and 24 are close together and therefore are operating with only a small amount of slip. Thus just prior to the time the friction clutch members engage, the slip of the hydraulic coupling may be as low as 3%. Prior to engagement of the friction clutch members 50 and 52 there is leakage flow of the liquid from the hydraulic coupling working chamber 26 radially outwardly through the passage 54 between the coupling elements 18 and 24. This escaping liquid flows over the frictionally engageable surfaces of the clutch members 50 and 52 thereby helping to remove at least some of the heat produced by their relative slippage as they engage.

When the valve 56 is moved to its dot and dash line position the annular space 23 is vented to the drain passage 62 whereupon the pressure of the hydraulic coupling liquid within the chamber 26 moves the hydraulic coupling member 18 to the right, as viewed in the drawing, to the position illustrated in Figure 2. As the coupling element 18 moves away from the coupling element 24, the friction clutch members 50 and 52 disengage whereupon the coupling operates with some slip and the magnitude of this slip increases as the coupling elements 18 and 24 move apart thereby at least partially unloading the coupling. In this way the magnitude of the torque transmitted by the coupling can be controlled by varying the axial spacing of the hydraulic coupling elements 18 and 24. Disengagement of the friction clutch members also serves to open the drain passage 54 whereupon liquid drains from the coupling working chamber 26. This leakage liquid flow to some extent functions to increase the slip of the coupling and in addition helps to remove heat produced within the coupling because of its slippage. The passage 54 when fully open may be sufficiently large to cause liquid to drain from the coupling faster than said liquid enters the coupling through the passage whereupon the coupling would empty thereby effectively disconnecting the drive members 10 and 28 to completely unload the coupling. If however said drain passage 54, when fully opened, is not large enough to cause the coupling to empty, or if it is desired to increase the rate at which the coupling empties, then the supply of oil to the coupling may be shut off at the valve 32.

With the hydraulic coupling construction of Figures 1 and 2 the magnitude of the slip between the coupling elements 18 and 24 can be decreased or increased by axially moving said coupling elements toward or away from each other respectively and this slip becomes zero when the friction clutch members 50 and 52 engage. In an installation where operation of a hydraulic coupling with the usual small percentage of slip is not objectionable, the friction clutch members 50 and 52 may be dispensed with. Such a modification is illustrated in Figure 3. The hydraulic coupling of Figure 3 is generally similar to that of Figures 1 and 2 and the parts of Figure 3 corresponding to the parts of Figures 1 and 2 are designated by similar reference numerals but with a subscript $a$ added thereto.

In Figure 3, the compressor housing 16a has a two-part construction and is provided with a rim portion 70 which overlies the annular leakage passage 54a between the outer peripheries of the coupling elements 18a and 24a. The rim portion 70 has a plurality of drain openings 72 which are uncovered by the coupling element 18a when said element moves to the right from its position in Figure 3 thereby opening said leakage passage 54a. In addition the rotary coupling housing 16a has an annular flange 74 forming the cylindrical surface 22a within which the hydraulic coupling element 18a is axially slidable. The flange 74 is provided with a plurality of slots 76 which are arranged to be uncovered by the seal ring 48a when fluid pressure is supplied to the annular space 23a behind the hydraulic coupling element 18a. The coupling housing 16a is also provided with one or more drain openings 78. In addition the coupling of Figure 3 may be provided with a drain opening or openings 80 to provide a continual but small circulation of liquid through the coupling working chamber 26a. Drain openings similar to the openings 80 of Figure 3 may also be provided in the modification of Figures 1 and 2.

The arrangement of Figure 3 is such that when fluid under pressure is supplied to the annular space 23a said fluid pressure moves the hydraulic coupling element 18a toward the complementary hydraulic coupling element 24a until the coupling element 18a begins to uncover the slots 76 whereupon said fluid escapes through the slots 76 and the drain openings 78, the coupling element 18a stopping at a position at which the fluid pressure in the annular space 23a balances the liquid pressure within the working chamber 26a and in this position of the coupling element 18a the rim portion 70 of the housing 16a closes the leakage passage 54a between the coupling elements 18a and 24a. In this way, when fluid under pressure is supplied to the annular space 23a the slots 76 determine the position to which the hydraulic coupling element 18a moves, said slots being disposed so that the hydraulic coupling element 18a moves to a position at which the axial clearance between the hydraulic coupling elements 18a and 24a is a minimum whereupon the coupling operates with a small minimum amount of slip.

When the fluid pressure to the annular space 23a is shut off and said space is vented, the liquid pressure within the coupling working chamber 26a moves the coupling element 18a to the right (as viewed in the drawing) thereby increasing the slip of the coupling. This movement of coupling element 18a uncovers the drain openings 72 in the rim 70 whereupon liquid drains from the coupling working chamber 26a through the passage 54a and drain openings 72. As in the modification of Figures 1 and 2, when the axial separation between the hydraulic coupling elements is a maximum, the leakage of the coupling liquid radially outwardly through the passage 54a between the coupling elements 18a and 24a may be of sufficient magnitude to cause the coupling working chamber 26a to empty.

It should now be apparent that the operation of the hydraulic coupling of Figure 3 is like that of Figures 1 and 2 except in Figure 3 the coupling elements never lock up to provide a 1:1 speed ratio drive and instead said elements always operate with some slip.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim:

1. A hydraulic coupling comprising driving and driven coupling elements providing a chamber therebetween adapted to contain the working fluid of the coupling; means providing a cylindrical bore within which one of said coupling elements is axially movable toward and away from the other of said elements; means for supplying working fluid under pressure to said chamber; separate means for supplying a fluid under pressure to said bore behind said one coupling element at a pressure sufficient for axially moving said one coupling element toward the other coupling element against the pressure of the working fluid within said chamber; means operable independently of the supply of working fluid to the chamber for relieving the fluid pressure in said cylindrical bore means; and a pair of clutch members each drivably connected to one of said coupling elements, said clutch members being drivably engageable upon axial movement of said one coupling member toward the other coupling member.

2. A hydraulic coupling comprising driving and driven coupling elements providing a chamber therebetween adapted to contain the working fluid of the coupling; discharge passage means between said coupling elements at the periphery of said coupling elements for bleeding said working fluid from said chamber when said coupling elements are axially disposed away from each other; means for supplying working fluid to said chamber for continuous flow through said chamber and said discharge passage when said discharge passage is open; means providing a cylindrical bore within which one of said coupling elements is axially movable toward and away from the other of said elements; means for supplying a fluid under pressure to said bore behind said one coupling element for axially moving said one coupling element toward the other coupling element against the pressure of the working fluid within said chamber; and a pair of clutch members each drivably connected to one of said coupling elements, said clutch members being drivably engageable upon axial movement of said one coupling member toward the other coupling member, and said clutch members when engaged substantially closing said discharge passage means between said coupling elements thereby obstructing the flow through said chamber.

References Cited in the file of this patent

UNITED STATES PATENTS

| | | |
|---|---|---|
| 1,203,265 | Radcliffe | Oct. 31, 1916 |
| 1,672,232 | Saives | June 5, 1928 |
| 2,073,357 | Wemp | Mar. 9, 1937 |
| 2,179,149 | Gruenberger | Nov. 7, 1939 |
| 2,226,760 | Pottinger | Dec. 31, 1940 |

FOREIGN PATENTS

| | | |
|---|---|---|
| 668,839 | France | Nov. 7, 1929 |